Patented July 8, 1924.

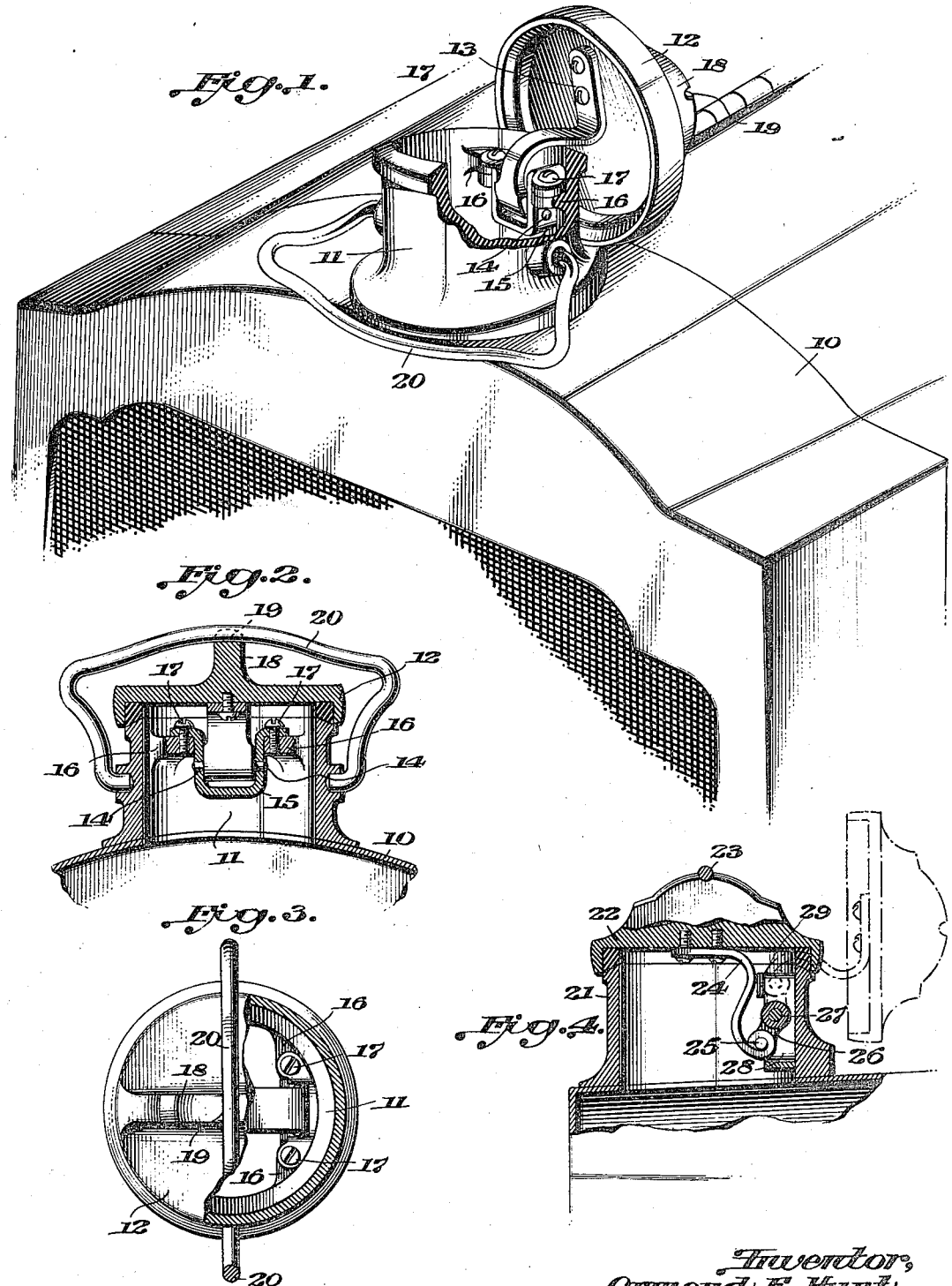

1,500,622

UNITED STATES PATENT OFFICE.

ORMOND E. HUNT, OF DETROIT, MICHIGAN, ASSIGNOR TO PACKARD MOTOR CAR COMPANY, OF DETROIT, MICHIGAN, A CORPORATION OF MICHIGAN.

RADIATOR CAP FOR MOTOR VEHICLES.

Application filed April 18, 1919. Serial No. 291,051.

*To all whom it may concern:*

Be it known that I, ORMOND E. HUNT, a citizen of the United States, and resident of Detroit, Wayne County, State of Michigan, have invented certain new and useful Improvements in Radiator Caps for Motor Vehicles, of which the following is a specification.

This invention relates to motor vehicles and more particularly to filler caps for the radiators of such vehicles.

The principal object of the invention is to provide a cap for the filling opening of radiators which shall be permanently connected to the latter and in which the hinge construction for pivotally connecting the radiator and cap shall be concealed within the mouth of the radiator so as to protect the hinge and preserve an attractive exterior appearance for the cap.

With these objects in view the invention is embodied in preferable form in the construction hereinafter described and illustrated in the accompanying drawings, in which drawings:

Fig. 1 is a perspective view of the front part of the hood of a motor vehicle and of the radiator and showing the invention applied to the filler mouth of the radiator, Fig. 2 is a vertical section through the cap and filler mouth.

Fig. 3 is the top plan view partly broken away, and

Fig. 4 is a vertical section at right angles to Fig. 2 and showing a modified form of hinge.

Referring to the drawings, 10 indicates the shell of a radiator and 11 a filler mouth formed by a raised hollow cylindrical body projecting above the body of the part 10 and which is adapted to receive water poured from a suitable vessel into the open end of the mouth from whence it passes to the radiator and other parts of the cooling system. This mouth is provided with a cap 12 which is pivotally and permanently connected to the filler mouth so that the latter may be readily uncovered or closed but so that at the same time there is no danger of losing the cap as in those constructions in which the same is separable from the mouth.

Referring to the construction illustrated in Figs. 1, 2 and 3, 13 is an arm fixed to the inner surface of the cap 12 and bent at right angles to its attaching part so as to extend downward into the filler mouth and having at its lower end pintles 14 which engage in sockets in a U shaped bracket 15. The bracket 15 has ears resting upon and secured to lugs 16, preferably formed integral with the wall of the filler mouth and extending inwardly therefrom. Screws 17 connect the ears to the lugs. By this construction it will be seen that a simple concealed hinge is provided and one with which the filler cap may be readily connected.

The cap is provided with an exterior raised boss 18 having a notch 19 adapted to be engaged by a spring bail 20 which serves as a locking member to hold the cap in closed position.

In Fig. 4 another form of hinge is illustrated. In this construction 21 is the filler mouth, 22 the cap and 23 the spring locking bail. The cap is provided on its under surface with an arm 24 adapted to be bent down into the interior of the filler mouth and having at its lower end a pin or pins 25 which engage sockets in a link 26, which in turn is pivoted at 27 to a bracket member 28 depending from the lugs 29. This construction affords a double joint between the cap and the filler mouth wall and provides a simple connection that will permit the cap to swing down to a position substantially in a vertical plane.

Having thus described my invention what I claim and desire to secure by Letters Patent is:

1. A motor vehicle radiator having a filler mouth, a cap therefor, an arm rigidly secured to the cap and extending into the mouth, a pivotal connection between the free end of the arm and the inner part of the mouth, said arm being shaped to permit the cap to open on said pivotal connection away from the mouth, and yielding means for pressing the cap against the end of the mouth.

2. A motor vehicle radiator having a filler mouth, a filler cap, an arm rigidly secured to said cap on the inside thereof and projecting laterally therefrom, a hinge member secured in said mouth below the outer end thereof, and a pivoted connection between said arm and said hinge member.

3. A motor vehicle radiator having a filler mouth, a filler cap, an S-shaped arm rigidly secured at one end to the under surface of said cap and projecting laterally therefrom, a hinge member secured in said mouth below the outer end thereof, and a pivotal connection between the other end of said S-shaped arm and said hinge member.

In testimony whereof I affix my signature.

ORMOND E. HUNT.